(12) United States Patent
Choi (10) Patent No.: US 6,747,597 B2
(45) Date of Patent: Jun. 8, 2004

(54) NAVIGATION SYSTEM (75) Inventor: Yong-Ik Choi, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 25 days.

(21) Appl. No.: 10/139,212

(22) Filed: May 3, 2002

(65) Prior Publication Data

US 2002/0196189 A1 Dec. 26, 2002

(30) Foreign Application Priority Data

May 3, 2001 (KR) .......................... 2001-24171

(51) Int. Cl.$^7$ .............................. G01S 5/02; H04B 7/185
(52) U.S. Cl. ..................... 342/357.1; 701/209; 701/211
(58) Field of Search ....................... 342/357.1, 357.09; 701/209, 211, 213

(56) References Cited

U.S. PATENT DOCUMENTS 5,223,844 A * 6/1993 Mansell et al. ............. 342/457
5,488,352 A * 1/1996 Jasper ........................ 340/431
5,941,930 A * 8/1999 Morimoto et al. .......... 701/201

* cited by examiner

Primary Examiner—Theodore M. Blum
(74) Attorney, Agent, or Firm—Dilworth & Barrese LLP (57) ABSTRACT There is provided a navigation system. In the navigation system, a navigation device determines route guidance time points using comprehensive route guidance information and sensor information and generates specific route guidance information, a portable terminal provides the comprehensive route guidance information and displays the specific route guidance information received from the navigation device, and a connector connects the portable terminal to the navigation device.

24 Claims, 13 Drawing Sheets

NAVIGATION SYSTEM

PRIORITY

This application claims priority to an application entitled "Navigation System" filed in the Korean Industrial Property Office on May 3, 2001 and assigned Ser. No. 2001-24171, the contents of which are hereby incorporated by reference.

BACKGROUND OF THE INVENTION

1. Field of the Invention

The present invention relates generally to an in-vehicle navigation system, and in particular, to an in-vehicle navigation device that can be used in conjunction with an existing portable terminal.

2. Description of the Related Art

In general, an in-vehicle navigation device is used as a stand-alone unit or integrated into a terminal like a PDA (Personal Digital Assistant). As portable terminals including mobile phones, PDAs, etc. become widespread, in-vehicle navigation devices are increasingly used in conjunction with portable terminals.

However, redundancy in auxiliary devices such as displays has emerged as a concern in using the in-vehicle navigation devices in conjunction with the portable terminals. The redundant use of the devices leads to the decrease of available area for installation.

SUMMARY OF THE INVENTION

It is, therefore, an object of the present invention to provide an in-vehicle navigation device that is not a stand-alone type but an additional terminal to be connected to another terminal.

The foregoing and other objects are achieved by providing a navigation system. In the navigation system, a navigation device determines route guidance time points using comprehensive route guidance information and sensor information and generates specific route guidance information, a portable terminal provides the comprehensive route guidance information and displays the specific route guidance information received from the navigation device, and a connector connects the portable terminal to the navigation device.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
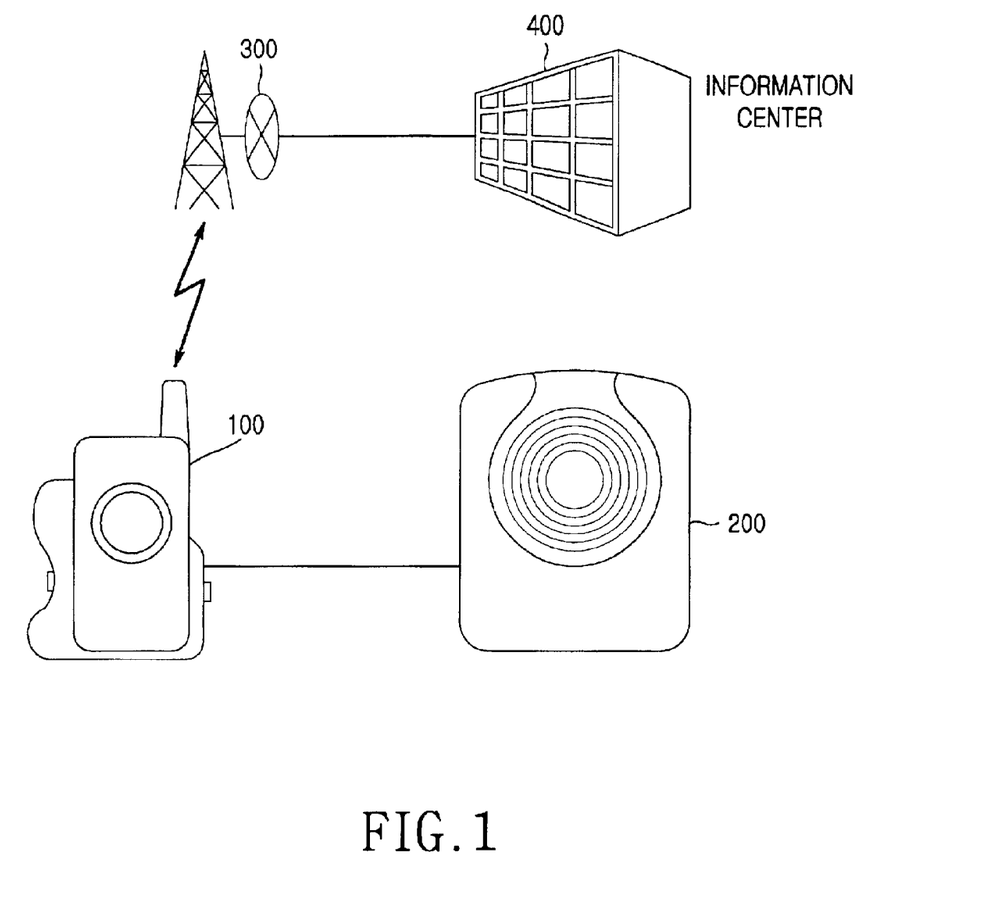
FIG. 1 illustrates an embodiment of an in-vehicle navigation system configuration according to the present invention.

FIG. 1 illustrates an embodiment of an in-vehicle navigation system configuration according to the present invention. Referring to FIG. 1, a portable terminal 100, to which a navigation device 200 is connected as an additional terminal, is connected to an information center 400 over a wireless network 300. The wireless network 300 is an IMT-2000 wireless network, for example. The information center 400 provides calculated route information, a map database, and traffic information needed for in-vehicle navigation.

While the portable terminal 100 is described as a mobile phone in the embodiment of the present invention, it is obvious that other existing terminals like a PDA can be used instead. The portable terminal 100 serves as an external processor that can reduce the performance requirement of the navigation device 200 and support connection to a communication network. The navigation device 200 as an additional terminal receives route guidance information through the portable terminal 100 and provides the route guidance information to a user at an appropriate time point.

A particular protocol is required for communication between the portable terminal 100 and the navigation device 200. A communication packet transmitted between the portable terminal 100 and the navigation device 200 is divided into two parts: one part includes general information (i.e., sensor information, graphical information, etc.) and/or comprehensive route guidance information and the other part includes protocols.

Figure 2:
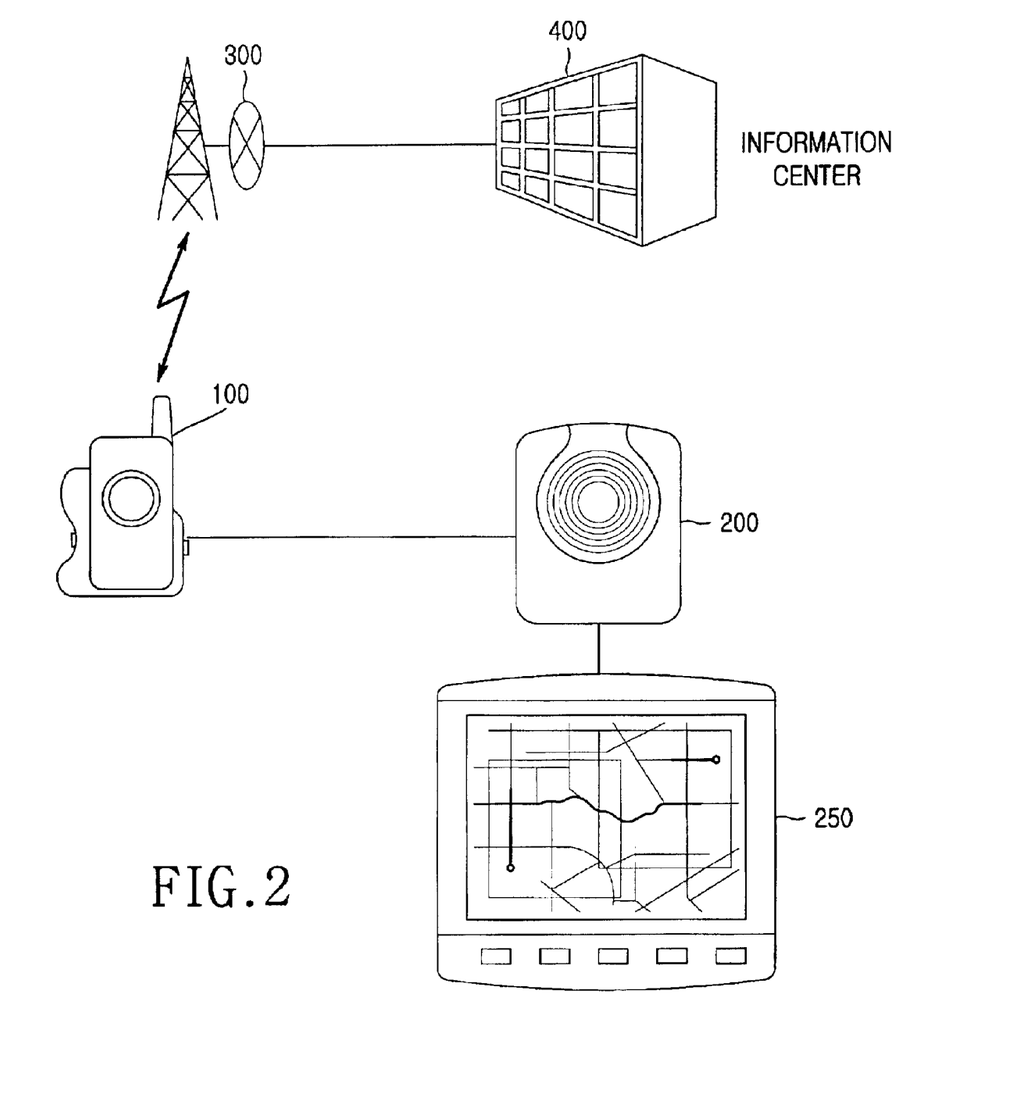
FIG. 2 illustrates another embodiment of the in-vehicle navigation system configuration according to the present invention.

FIG. 2 illustrates another embodiment of the in-vehicle navigation system configuration according to the present invention. The navigation device 200 illustrated in FIG. 1 is dependent on an external monitor, whereas the navigation device 200 illustrated in FIG. 2 has an integrated monitor set 250.

Figure 3:
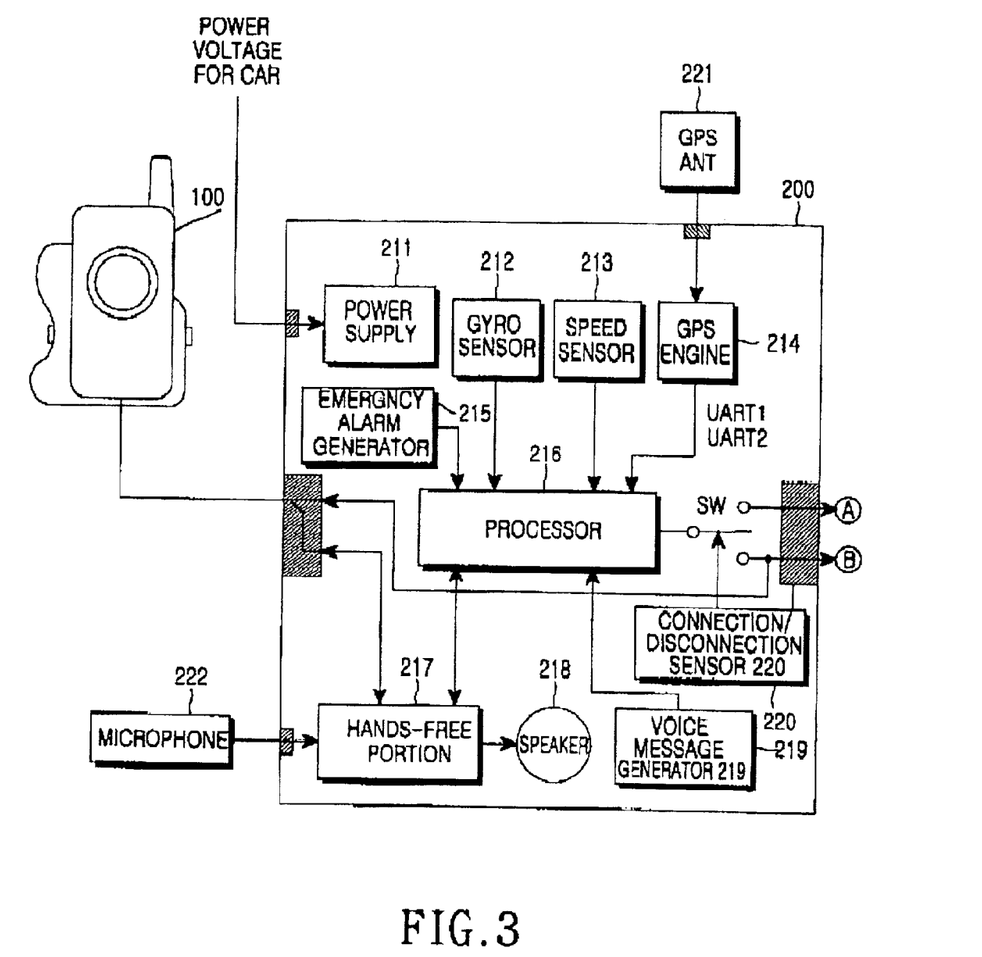
FIG. 3 is a block diagram of a navigation device illustrated in FIGS. 1 and 2 in conjunction with a portable terminal.

FIG. 3 is a block diagram of the navigation device illustrated in FIGS. 1 and 2 in conjunction with the portable terminal. The navigation device is implemented to function in a hands-free manner in the present invention.

Upon ACC-on, power is supplied from the car to the whole navigation device through the power supply 211. To improve performance and implement various functions, a backup battery can be used, or a B+ power supply in the car can be additionally used.

Referring to FIG. 3, a processor 216 calculates position data, controls mobile communication, hands-free operation, and battery charging, and handles emergency situations. A 16-bit microprocessor can be used as the processor 216.

When the navigation device 200 implements the hands-free function, it operates in the same manner as a typical hands-free kit. The hands-free portion 217 processes caller voice over the microphone 222 and called voice received through the portable terminal 100 in full-duplexing or half-duplexing and outputs the caller voice to the portable terminal 100 and the called voice to the spreaker 218. The processor 218 in the portable terminal takes charge of hands-free control through the hands-free portion 217 to ensure security to a confidential call or control volume.

If the navigation device 200 operates only in conjunction with the portable terminal 100, the processor 216 feeds initial information received from the gyro-sensor 212, the speed sensor 213, and the GPS engine 214 and information about a destination received at the portable terminal to the information center 400 via the wireless network 300. Then, the information center 400 provides comprehensive route guidance information to the navigation device 200 through the wireless network 300 and the portable terminal 100.

Upon receipt of the route guidance information, the navigation device 200 extracts necessary guidance data from the route guidance information using a variance in the vehicle heading, a variance in vehicle speed, and the absolute longitude and latitude position of the car received from the gyro-sensor 212, the speed sensor 213 and the GPS engine 214, and feeds it to the portable terminal 100. Then, the portable terminal displays the received guidance data.

The navigation device 200 can cope with emergency situations by additional use of a device like the emergency alarm generator 215. The emergency alarm generator 215 can be connected to devices in the car or use information collected by the speed sensor 213. This will not be described in detail herein.

Figure 4:
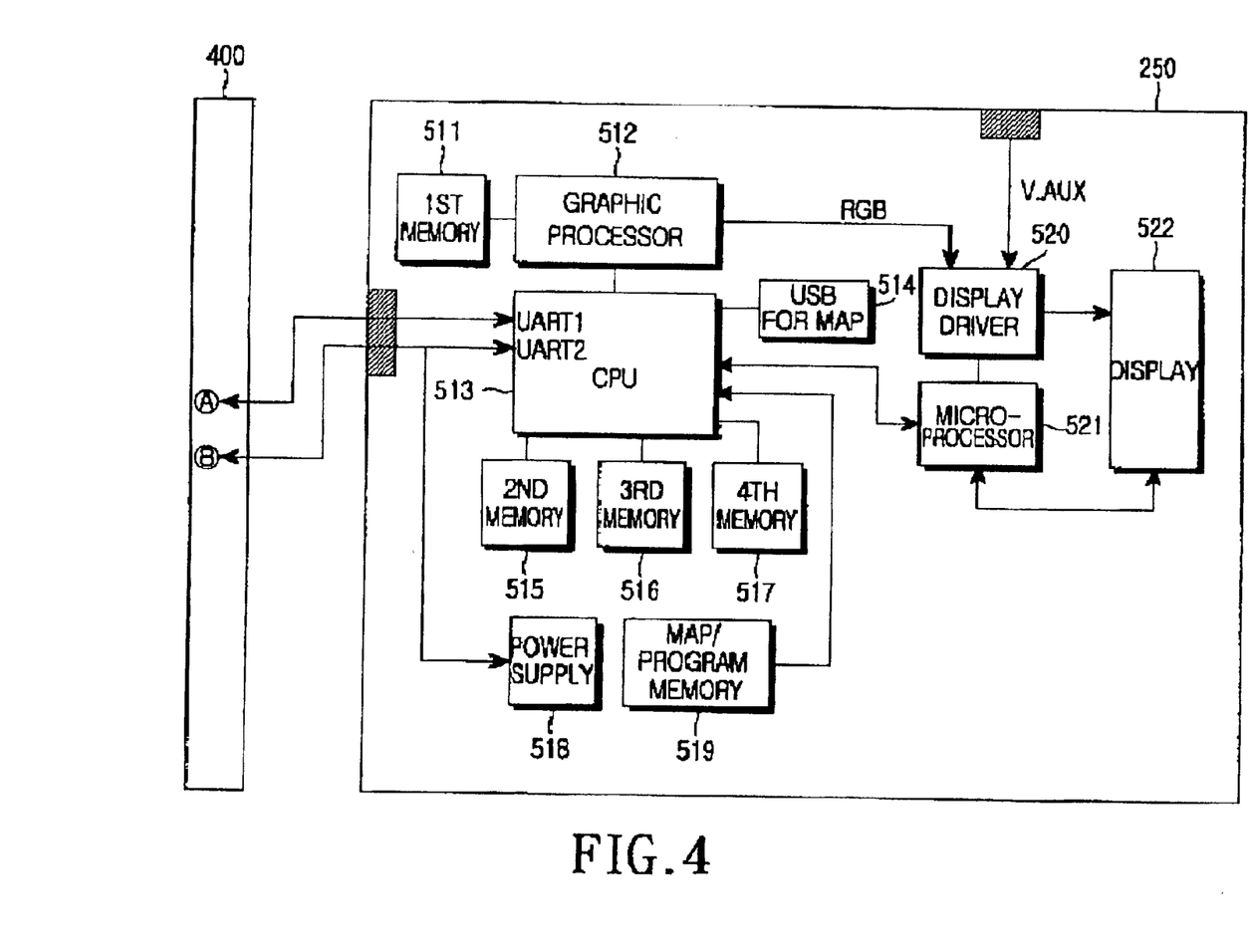
FIG. 4 is a block diagram of a monitor set connected to the navigation device to realize the monitor-integrated navigation device illustrated in FIG. 2.

FIG. 4 is a block diagram of the monitor set connected to the navigation device to realize the monitor-integrated navigation device 200, 250 illustrated in FIG. 2. Referring to FIG. 4, a CPU (Central Processing Unit) 513 processes received data, (for example, GPS data from navigation device 200) graphics, a navigation program and map data (received from information center 400 via navigation device 200) and includes a web browser. A DRAM (Dynamic Random Access Memory), a boot ROM (Read Only Memory), an SDRAM (Synchronous Dynamic Random Access Memory) and an SRAM (Static Random Access Memory) can be used as first to fourth memories 511, 515, 516 and 517. A map/program memory 519 can be a Nor flash memory.

GPS, gyro and speed data are transmitted from navigation device 200 and inter-processor communication between CPU 513 and processor 216 of FIG. 3 is performed via a port UART (Universal Asynchronous Receiver/Transmitter) 1, and communications to receive maps, etc. from information center 400 are conducted with the portable terminal 100 of FIG. 3 via another port UART 2.

A switch SW switches the port UART1 or UART 2 to the processor 216 under predetermined control.

Returning to FIG. 3, a connection/disconnection sensor 220 in the navigation device senses the connection or disconnection of the monitor set 250 to or from the navigation device 200 and controls connection between the ports UART1 & UART2 and the processor 216.

Connection between the monitor set 250 illustrated in FIG. 4 and the navigation device 200 illustrated in FIG. 3 have two aspects. They are connected via a port A and UART1 by the protocol illustrated in FIGS. 5 to 17 and described further below. Alternatively, they are connected via a port B and UART2, which implies that the monitor set 250 directly accesses a data modem of the portable terminal 100.

The power supply 518 provides main power from the car to the overall monitor set 250. This may be done from a power source other than the car, or via the navigation device 200 itself.

The CPU 513 collects position data received through UART1, on the roads on a digital map stored in MAP/PROGRAM MEMORY 519 and outputs the resulting graphic data (e.g., an RGB signal) to the display 522 through the display driver 520 to pinpoint the present vehicle position.

The microprocessor 521 may be additionally used to control the display driver 520 so that the overhead of the CPU 513 in processing graphical data may be reduced.

In particular, the display driver 520 may overlay other video signals received through a V.AUX on the display 522, or display other TV and video signals in other methods.

A map in the monitor set 250 can be updated by the user using the USB port for MAP 514. That is, the map is updated by connecting the USB of a user's PC to the USB for MAP 514 and updating MAP 519 with map information received at the CPU 513.

FIGS. 5 to 17 illustrate a protocol for supporting communication between the portable terminal 100 and the navigation device 200 illustrated in FIG. 1 according to the present invention. The protocol incorporates communication between the navigation device 200 and the monitor set 250 illustrated in FIG. 2.

When the navigation system is configured as illustrated in FIG. 1, a user interface is provided using the portable terminal 100. Therefore, the protocol depicted in FIGS. 5 to 17 is applied to communication between the navigation device 200 and the portable terminal 100. On the other hand, if the navigation system is configured as illustrated in FIG. 2, the portable terminal 100 simply serves as a data modem. Therefore, the protocol is applied to communication between the navigation device 200 and the monitor set 250 over PORT A/UART 1. The following table lists commands exchanged in the signal flows depicted in FIGS. 5 to 16.

| Command | Function |
| --- | --- |
| SC_ACK/NACK | Response (acknowledgement/negative acknowledgement) |
| SC_REQPOSINFO | Request position information |
| SC_POSINFO | Position information |
| SC_REQGPSINFO | Request GPS information |
| SC_GPSDATETIME | Data/time information in GPS information |
| SC_GPSINFO | GPS information |
| SC_REQDIFFVAL | Request sensor error correction information |
| SC_DIFFVAL | Sensor error correction information |
| SC_MMFEEDBACK | Transmit additional information for sensor error correction |
| SC_DIFFSPEED | Speed sensor error correction information |
| SC_DIFFGYRO | Gyro sensor error correction information |
| SC_REQCARSTATUS | Request car status information |
| SC_CARSTATUS | Car status information |
| SC_VOICEINFO | Voice information sub-command for playing, resetting, or stopping voice message |
| SC_DGPSINFO | DGPS information |
| SC_GUIDECTRL | Stop guidance or request other guidance information. Request summary of comprehensive route guidance information |
| SC_GUIDEINFORMA | Transmit infrequent guidance information (e.g., intersection name) and summary of comprehensive route guidance information |
| SC_GUIDEINFORMB | Transmit frequent guidance information |
| SC_GUIDESTS | Guidance status information |
| SC_EMERGENCY | Emergency information |
| SC_CALLOP | Call operator |

Figure 5:
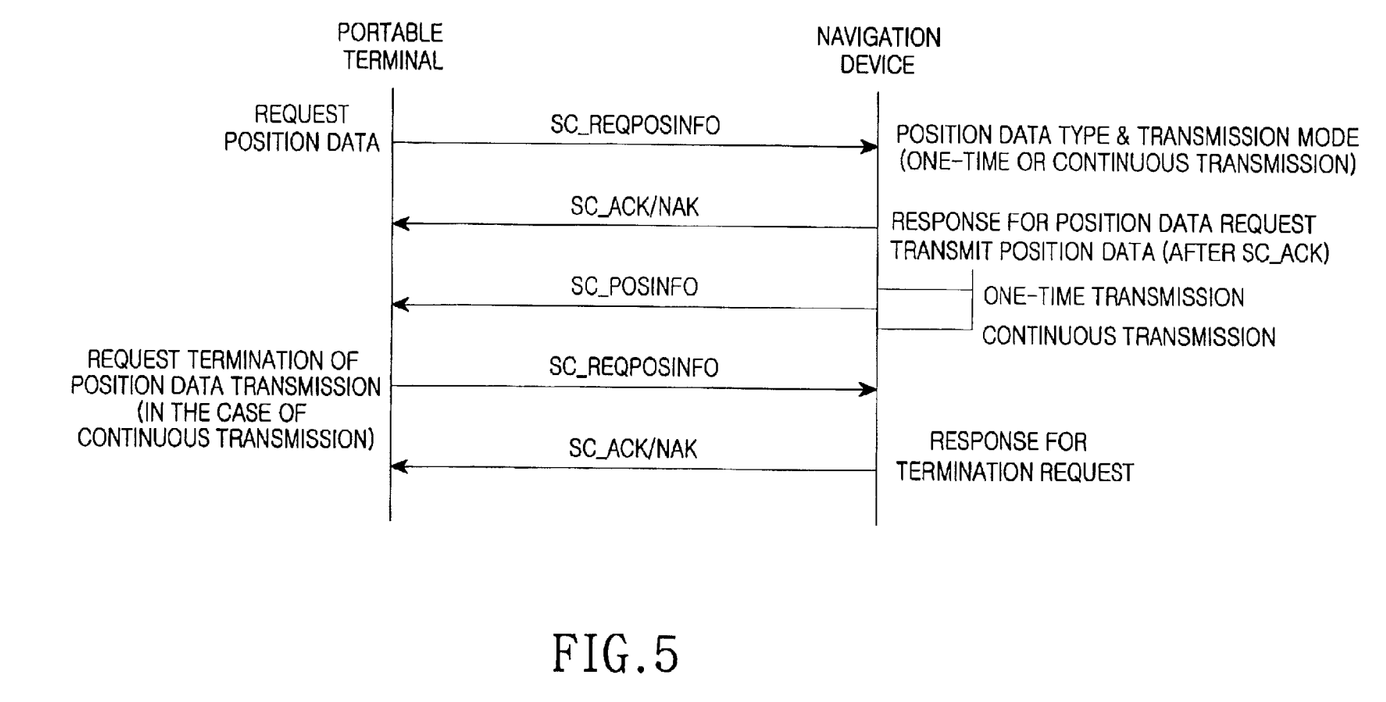
FIGS. 5 to 17 are signal flow diagrams illustrating a protocol for supporting communication between the navigation device and the portable terminal illustrated in FIG. 1 according to the present invention.
Figure 6:
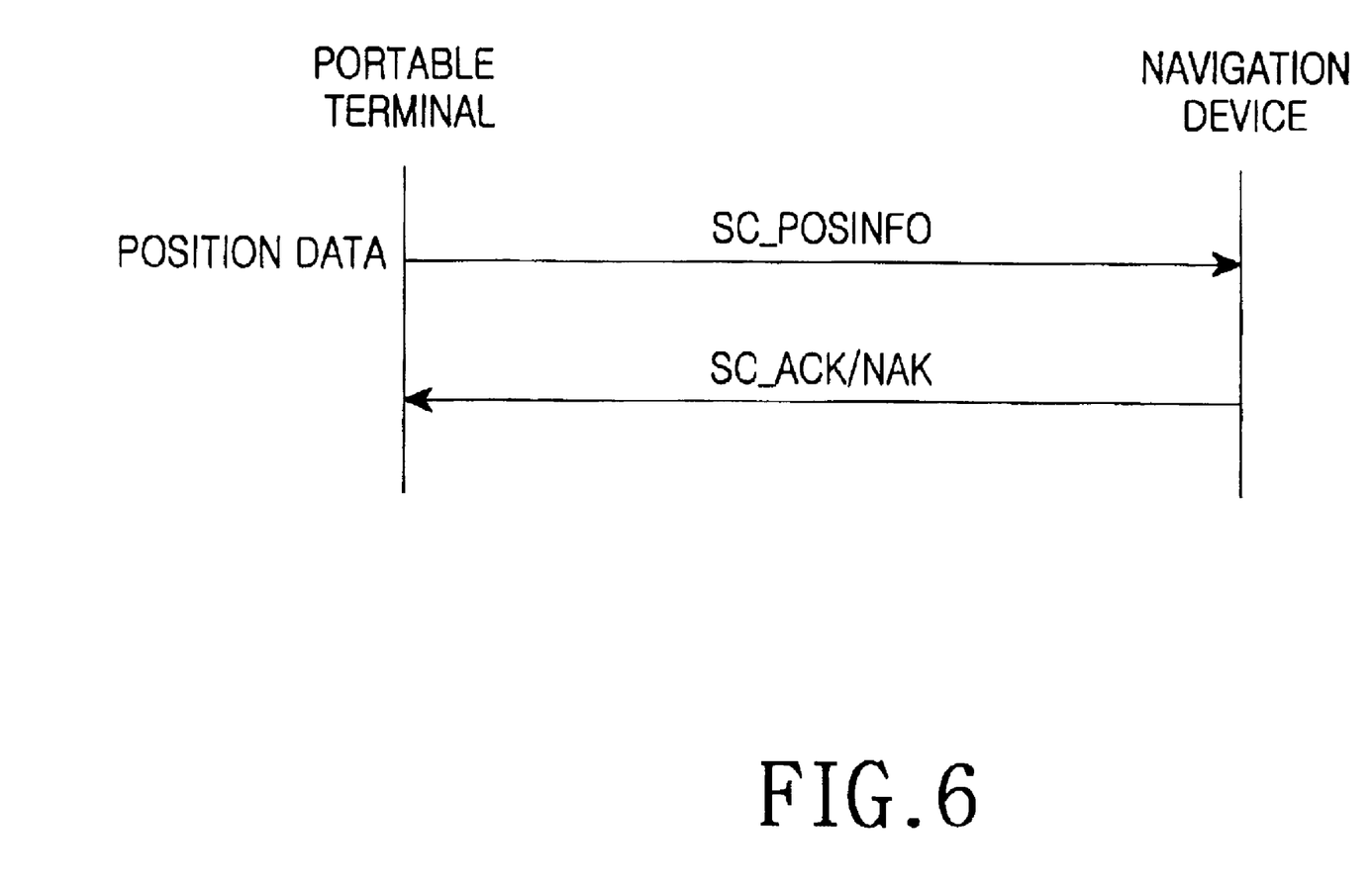

FIG. 5 is a diagram illustrating a signal flow for position data packet transmission from the navigation device 200 to the portable terminal 100 in FIG. 1 for display or from the monitor 250 set to the navigation device 200 through A in FIG. 2 and FIG. 6 is a diagram illustrating a signal flow for position data packet transmission from the monitor set to the navigation device. The position data packets transmitted from navigation device 200 to portable terminal 100 shown in FIG. 5 are determined from sensors in the navigation device 200.

Figure 7:
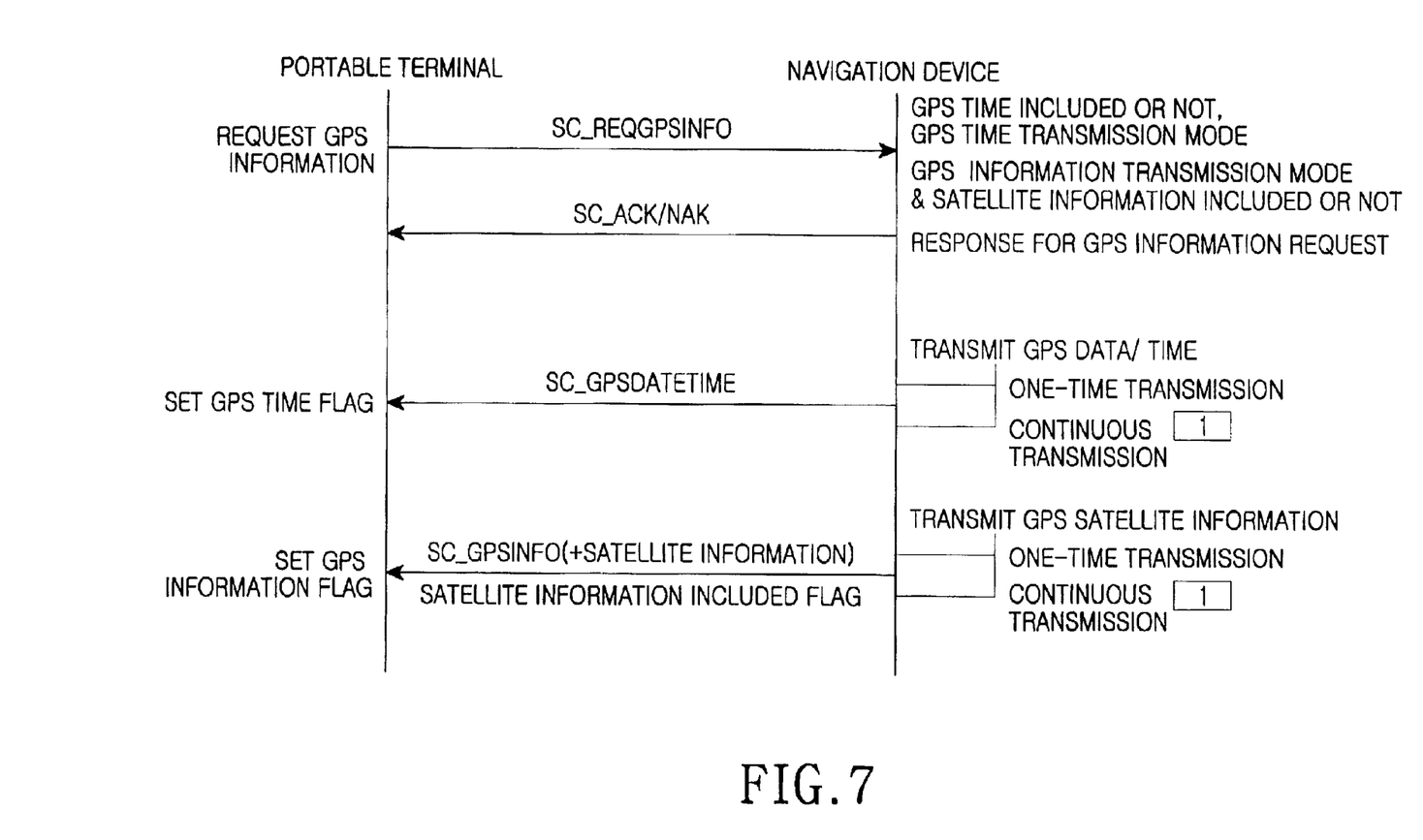

FIG. 7 is a diagram illustrating a signal flow for GPS information transmission to antenna 221. Upon request from the portable terminal 100, GPS packet transmission is carried out. When GPS information is requested, a transmission mode can be separately determined for GPS time and GPS information transmissions. In the case of a continuous GPS information request, GPS information can be transmitted every second. In the case where there is at least one request, i.e., an SC_REQGPSINFO packet with a continuous transmission flag set, continuous data transmission is available. Afterwards, continuous data transmission is carried out without being requested. If single data transmission is requested by an SC_REQGPSINFO indicating single transmission, continuous transmission is discontinued after transmission of the last packet. In the case of partial continuous transmission, continuous transmission flag is set with desired GPS data only in the SC_REQGPSINFO signal.

Figure 8:
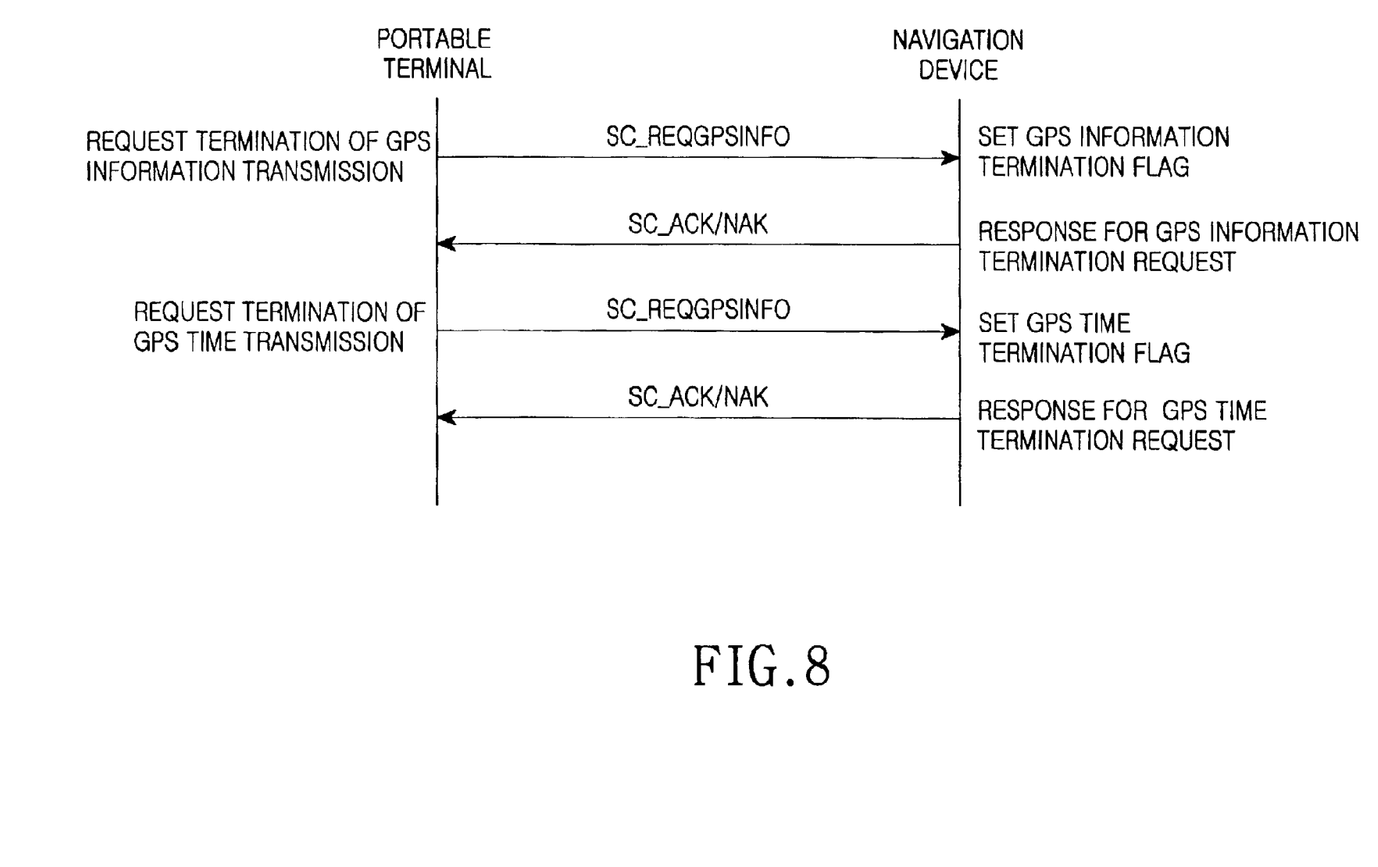

FIG. 8 is a diagram illustrating a signal flow for GPS packet transmission discontinuation. In the case of continuous transmission of GPS time and GPS information, the portable terminal can request discontinuation of GPS time and GPS information, separately.

Figure 9:
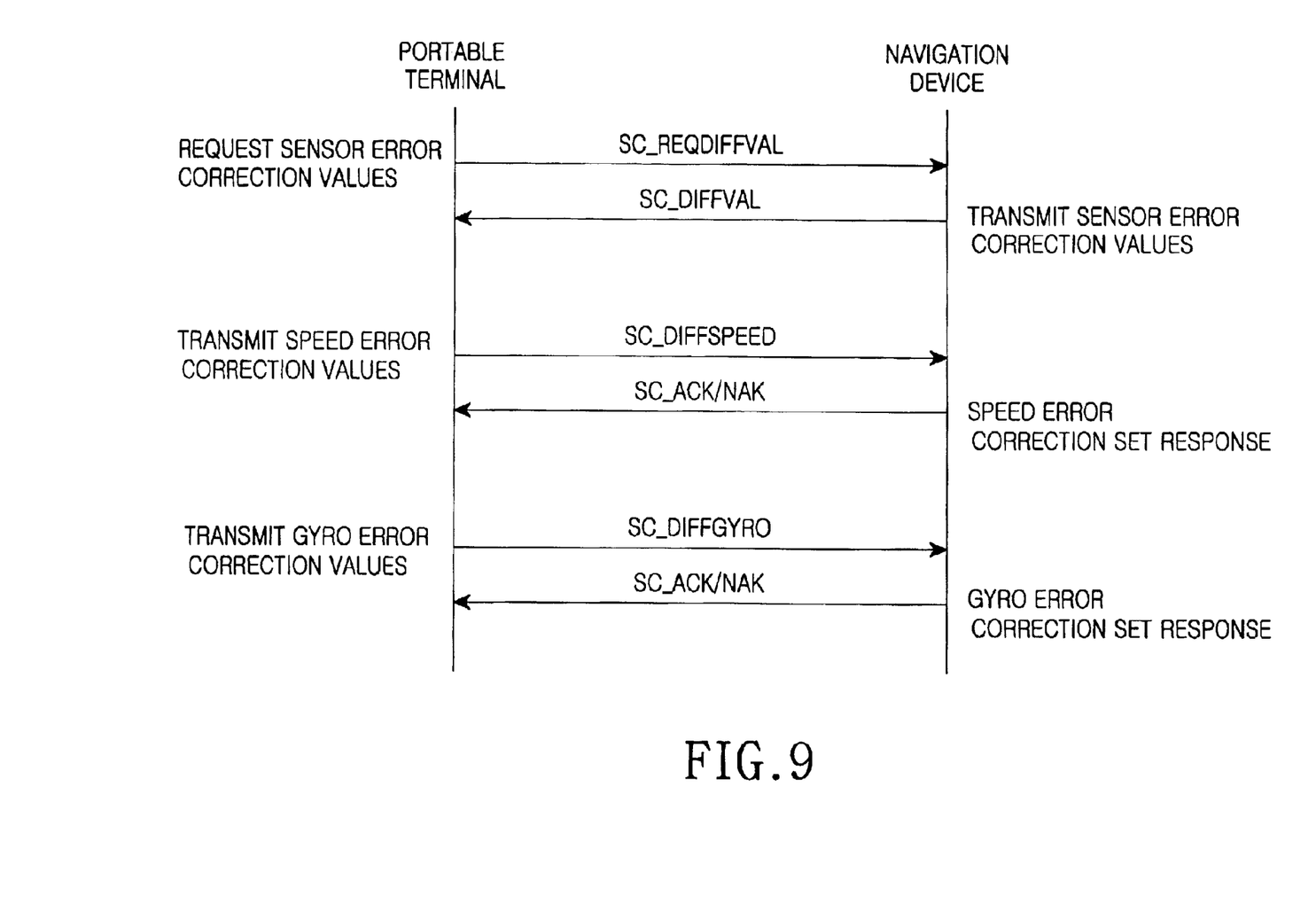

FIG. 9 is a diagram illustrating a signal flow for transmission of sensor error correction values. Upon input of sensor error correction values, generally input by a technician, the portable terminal transmits them to the navigation device, each in a one-time transmission mode. Correction value requests and error correction can be carried out in any place according to a specification. In general the operator adjusts the sensor error correction value according to car status while installing the navigation device. The operator sets the sensor error correction value through the portable terminal in the navigation system of FIG. 1, or through the user interface (e.g., touch screen or buttons) of the monitor set 250 in the navigation system of FIG. 2. Especially in the latter case, the sensor error correction value can be transmitted to the navigation device by automatic error correction through continuous matching to map information. However, this automatic correction is not available to the navigation device of FIG. 1 because it does not have map data in itself.

Figure 10:
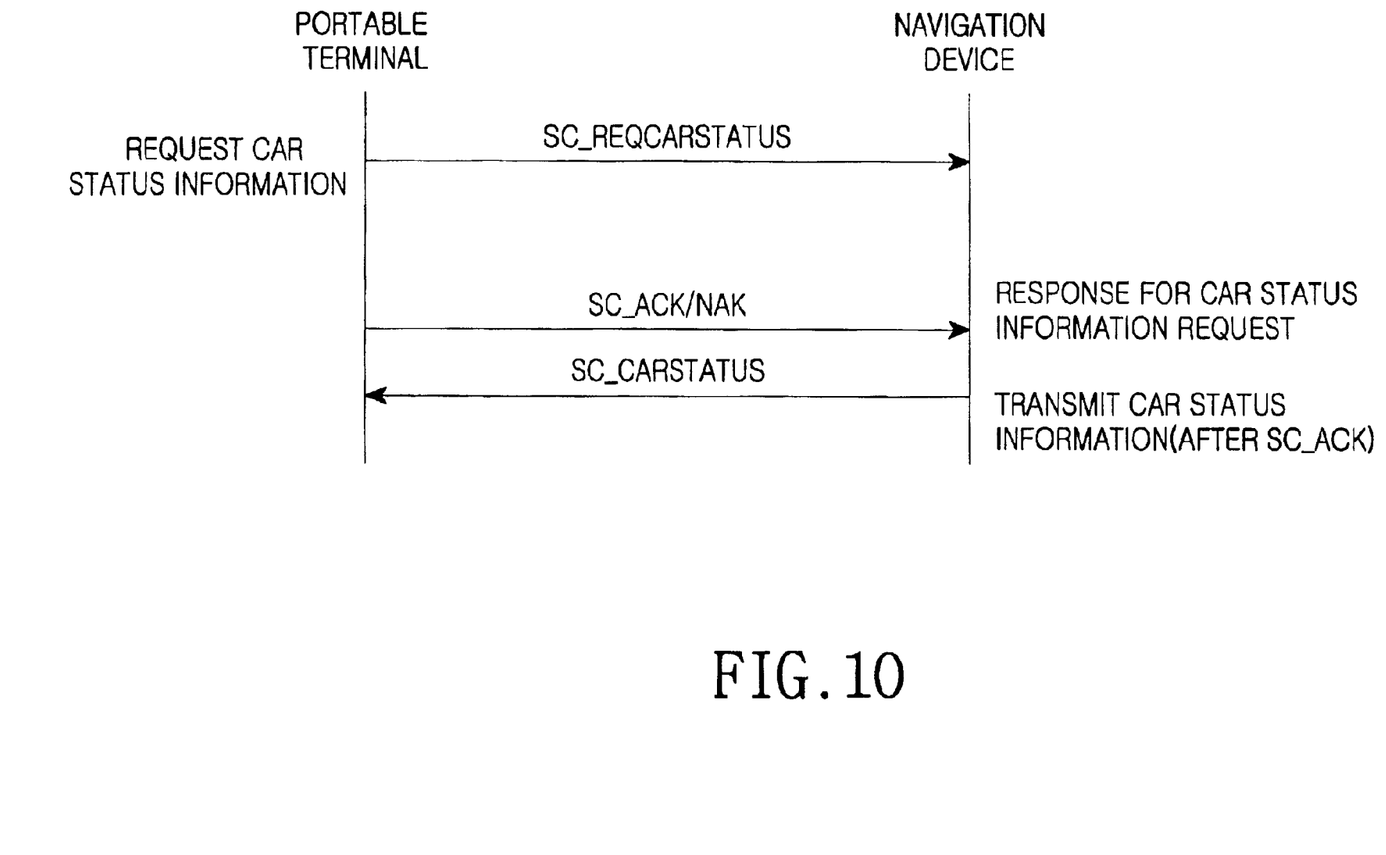

FIG. 10 is a diagram illustrating a signal flow for transmission of car status information. If the portable terminal requests car status information, the navigation device transmits a car status information packet once. Car status information is generally not highly useful in the navigation system of FIG. 1. The car status information indicates parking brake state, foot brake state, reverse gear state, illumination state, etc. The car status information is thus useful to the navigation system of FIG. 2 having the monitor set 250, for more accurate guidance or adjustment of display state (e.g., change to a dark color at night).

Figure 11:
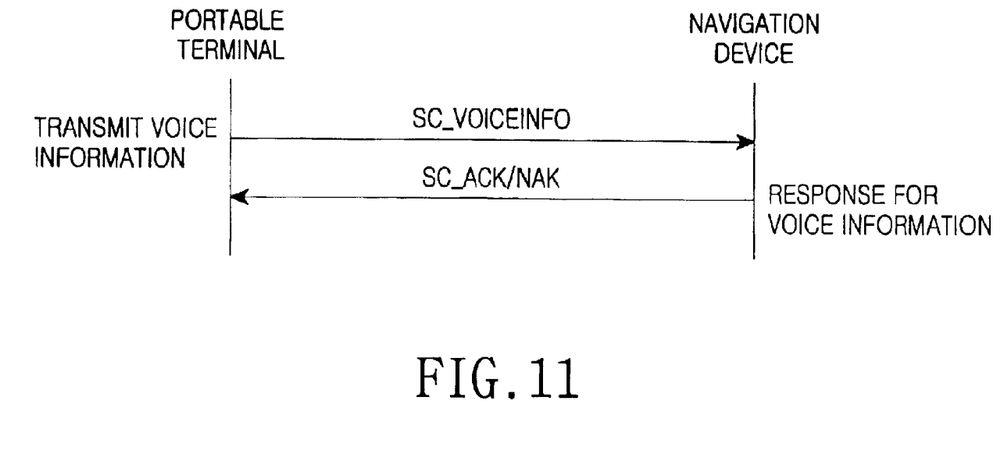

FIG. 11 is a diagram illustrating a signal flow for voice information transmission. If voice information is generated in the portable terminal 100, the portable terminal transmits it to the navigation device. In the navigation system of FIG. 1, SC_VOICEINFO causes the navigation device to generate a voice message as instructed by the portable terminal. This may occur in situations that the navigation device is not aware of (e.g., a situation where user confirmation is required during communication between the portable terminal 100 and the information center 400). The navigation device 200 functions only as a sensor in the navigation system of FIG. 2. Therefore, the monitor set 250 handles all situations related with guidance. By use of the packet depicted in FIG. 11, the navigation device 200 is invoked to output an appropriate voice message.

Figure 12:
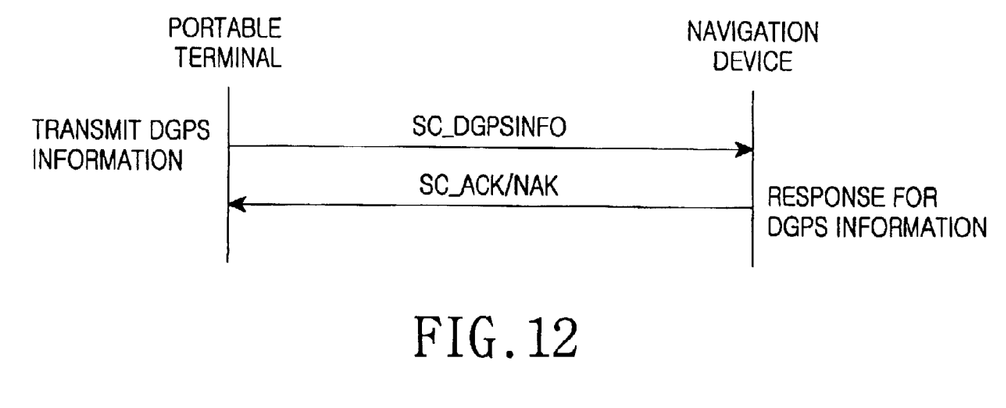

FIG. 12 is a diagram illustrating a signal flow for DGPS (Differential GPS) data packet transmission. The portable terminal transmits DGPS data received from the information center to the navigation device to set the present position.

Figure 13:
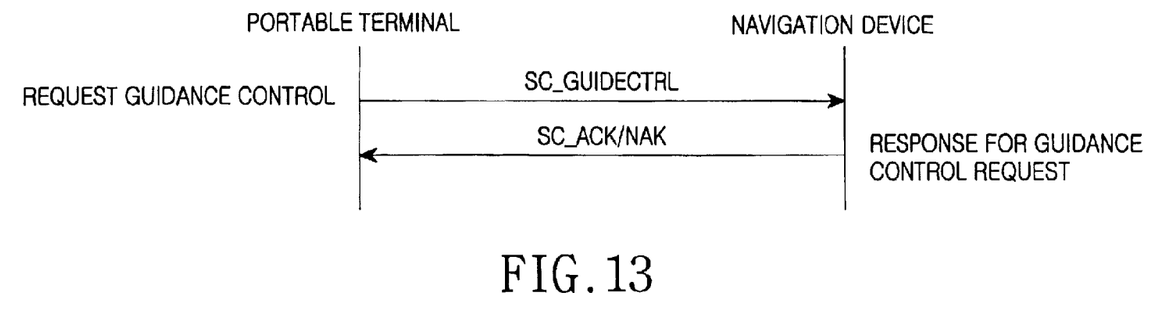

FIG. 13 is a diagram illustrating a signal flow for navigation control packet transmission. The portable terminal transmits 100 a navigation control command to the navigation device 200, for volume adjustment for a voice message, message output control (start, pause, stop, etc.), and re-play of the voice message. Thus, SC_GUIDECTRL functions to terminate route guidance, pause route guidance, etc.

Figure 14:
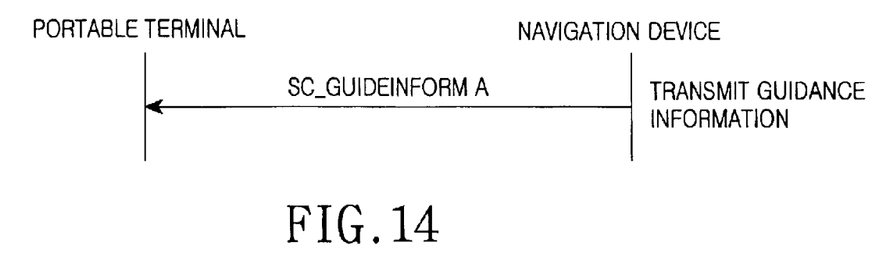

FIG. 14 is a diagram illustrating transmission of a guidance information packet A. The navigation device transmits guidance information (e.g., intersections, turning directions, and on-track or off-track information to portable terminal 100. Thus, FIG. 14 shows the navigation device 200 transmitting a summary of comprehensive route guidance information to the portable terminal 100 to be displayed. In the navigation system of FIG. 1, the navigation device has route guidance information and generates necessary guidance information based on data received from the GPS and sensors. Upon receipt of the guidance information from navigation device 200, the portable terminal 100 displays it. The navigation system of FIG. 2 may be configured so that the same thing applies to the monitor set 250 or the monitor set itself generates the necessary guidance information using the data from the GPS and sensors. Each time the portable terminal is connected to the navigation device, the guidance information packet A is transmitted once to the portable terminal regardless of whether route guidance is provided or not.

Figure 15:
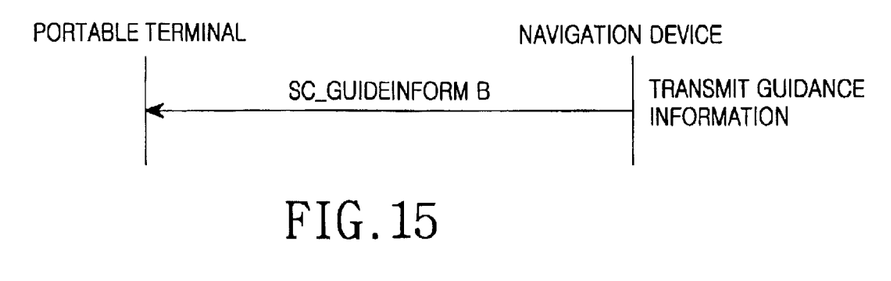

FIG. 15 is a diagram illustrating transmission of a guidance information packet B. The navigation device 200 transmits guidance information (e.g., expected time/distance to go) to the portable terminal 100. Each time the portable terminal is connected to the navigation device and an SC_ACK signal is received in response for the guidance information packet A, the navigation device transmits a guidance information packet B once to the portable terminal regardless of whether route guidance is provided or not. In addition, each time expected time and distance to a destination (or an intersection) are changed, the guidance information packet B is transmitted. The guidance information packet B may not be transmitted in some cases.

Thus, FIGS. 13–15 show, among other things, the navigation device transmitting specific route guidance information to the portable terminal to be displayed at successive points of time.

Figure 16:
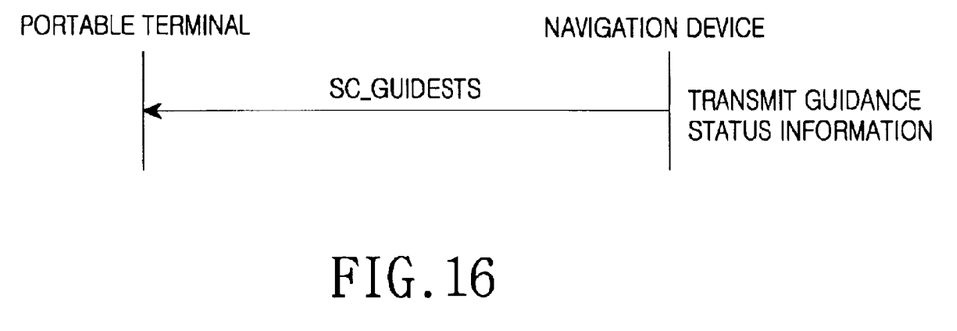

FIG. 16 is a diagram illustrating transmission of a navigation status packet. The navigation device 200 notifies the portable terminal 100 of a navigation guidance mode once when the portable terminal is connected to the navigation device or the navigation guidance mode is changed. Navigation guidance statuses are illustrated in the following table.

| Status | Sub-status | Progress step | Comment |
|---|---|---|---|
| Idle | | No guidance provided | |
| Guide | Guidance in progress, off track, route entry guidance | | |

Figure 17:
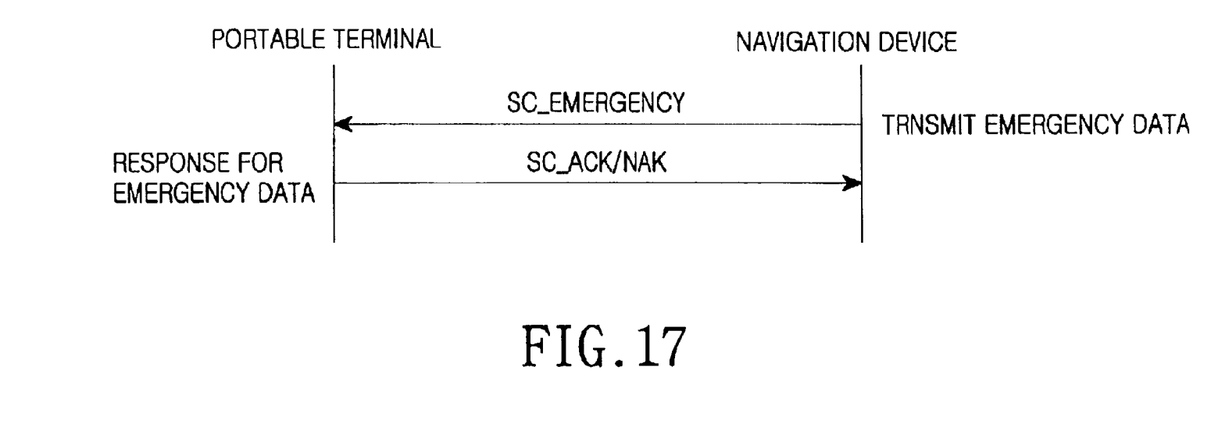

FIG. 17 is a diagram illustrating a signal flow for transmission of an emergency alarm packet. The navigation device 200 transmits an emergency command along with position data to the portable terminal 100. An emergency command (alarm) can be generated in many ways. For example, the emergency alarm can be generated in conjunction with the ECU based on various condition states of the car or through the speed sensor. In the case of a less serious emergency situation, like a need for car towing or running out of gas, the user generates an alarm by pressing a designated key in the navigation device. Upon generation of an emergency alarm, the portable terminal 100 is connected to the information center 400. Then, the portable terminal 100 requests the vehicle position to the navigation device 200 by SC_REQPOSINFO and the navigation device 200 sends the position information to the portable terminal 100 by SC_POSINFO. The portable terminal 100 feeds the position information to the information center 400. Then the information center 400 provides a voice call to the user to confirm the situation and ask a necessary action the user wants.

Now, the communication protocol for communication between the portable terminal and the navigation device will be described in detail.

The following protocol is applicable to a typical navigation device unless the portable terminal is involved with navigation or the protocol is incorporated in the navigation device 200. That is, this protocol is employed when the navigation device 200 operates in conjunction with the portable terminal or it is a monitor set-integrated type.

1. Position Data

Position data request packets are used by the portable terminal 100 to request vehicle position data from the navigation device 200 and to send to the information center 400 in the navigation system of FIG. 1, and to enable the monitor set 250 to pinpoint the present position of the vehicle on a map in the navigation system of FIG. 2.

(1) Position Data Packet command: SC_POSINFO latitude and longitude coordinates, bearing, speed, or an area code on an electronic map status: status information related to position information (e.g., reception status, DOP (Dilution Of Precision), etc.)

(2) Position Data Request Packet command: SC_REQPOSINFO information request and information request cancel information indicating the number of information transmissions (a one-time or continuous transmission mode)

2. GPS Data

GPS data is used to notify the user of GPS status in the navigation system of FIG. 1. If the current GPS state is an error state, the GPS data notifies the user of the GPS error state, simultaneously indicating that offered information lacks accuracy.

In the navigation system of FIG. 2, the monitor set 250 does not have a GPS device and sensors, as compared to a stand-alone navigation device. Therefore, the monitor set 250 uses GPS data to obtain the GPS and sensor information from the navigation device 200.

(1) GPS Information Request Packet command: SC_REQGPSINFO information request and information request cancel information indicating the number of information transmissions (a one-time or continuous transmission mode)

(2) GPS Time Information Packet command: SC_GPSDATETIME (3) GPS Satellite Information Packet command: SC_GPSINFO satellite altitude information and satellite status information (4) DGPS Information Packet command: SC_DGPSINFO data: DGPS data (RTCM format)

3. Sensor (Speed/Gyro Sensor) Error Correction.

These packets are used for the same functionality as that of the GPS packet for the navigation system of FIG. 2.

(1) Speed Sensor Error Correction Value command: SC_DIFFSPEED a speed sensor error correction value is set and a user-checked sensor error correction value is set differential correction value (2) Gyro Sensor Error Correction Value command: SC_DIFFGYRO a gyro error correction value is set differential correction value (3) Sensor Error Correction Value Request command: SC_REQDIFFVAL sensor identification (speed/gyro)

(4) Sensor Error Correction Value Response (For Both Sensors)

command: SC_DIFFVAL speed sensor differential correction value and gyro sensor differential correction value (5) Additional Information for Sensor Error Correction command: SC_MMFEEDBACK longitude and latitude coordinates bearing data 4. Car Status Packet The car status packets are used to detect the foot brake state, parking brake state, and reverse movement of the car and then perform map matching using the detected information and GPS and sensor information received from the navigation device 200 in the navigation system of FIG. 2.

(1) Car Status (GPS/Speed/Gyro/Side Brake)

command: SC_CARSTATUS car status such as presence or absence of sensors, illumination, backward motion memorizing, etc.

(2) Car Status Information Request command: SC_REQCARSTATUS

A communication protocol for system control will be described below in detail.

1. Response Packet

:response for a request

This packet indicates whether a transmitted command is acknowledged or not.

ACK for Successive Packet Reception command: SC_ACK parameter: ACK/NACK

2. Voice Packet command: SC_VOICEINFO
 sub-command (play/reset/stop/version/mute/volume control)
 additional parameters for play
 1) count: command/phrase repetition count. The count can be set to up to 255
2) phrase: a one-byte voice record index or any other corresponding code, a TTS string.

This is a packet that the portable terminal 100 or the monitor set 250 sends the navigation device 200 to ask the user a question or warn him of some situation by voice in the navigation system of FIG. 1, and to output a voice message through the navigation device 200 to provide route guidance.

3. Guide Control (1) Guide control

Guide Control is aimed at sending data to be displayed in the navigation system of FIG. 1. GUIDEINFORMA is provided when guiding waypoints are changed, while GUIDEINFORMB is provided when distance to go is changed.

By Guide Control, the on-track or off-track state of the car, the name of an intersection at a guiding waypoint, the direction to a destination, and the heading of the car are notified to the portable terminal having a user interface, so that it can display the information in a predetermined method.

In particular, GUIDEINFOMA is so configured that it can send a summary of route information between the present position and the destination. Upon user request through the portable terminal 100, the summary information is provided to the portable terminal 100 to be displayed.

command: SC_GUIDECTRL
 (1)-1. Request GUIDEINFORMA
 :main guidance information request
 (1)-2. Request Guide List
 :request summary of comprehensive route guidance information
 sub-command: SC_REQLIST
 (1)-3. Guide Status Control (Start/Pause/Stop)
 : change status of navigation device
sub-command: SC_CTRLSTAT
(2) Guide A
: provide intersection information in the case of a popular type navigation device
(2)-1. Transmit Summary of Route Guidance Information
sub-command: SC_GUIDELIST
 summary information including distance to destination, presence or absence of a highway, direction to destination, and entrance/exit of highway
(2)-2. Transmit Intersection Information (Transmit Infrequent Information)
sub-command: SC_GUIDEMNV
turning direction icon ID
name of intersection at which to turn
distance to a turning waypoint
expected time to destination
distance to destination
(3) Guide B (Transmit Frequent Information)
command: SC_GUIDEINFORMB
distance to a turning waypoint
expected time (4) Guide Status
: transmit status information upon request from navigation device
 command: SC_GUIDESTS
 status information such as guidance in progress, off track, emergency, and presence or absence of route guidance information
 hands-free kit eSTAT: refer to (1)-2
(5) Emergency
: transmit emergency data upon sensing pressing of an emergency key Upon receipt of an emergency packet, the portable terminal 100 is connected to the information center 400 and sends position data received from the navigation device 200 by SC_POSINFO to the information center 400.

command: SC_EMERGENCY
 command: SC_EMERGENCY
 identical to a position data packet except the command property As described above, the navigation device as an additional terminal according to the present invention can be connected to an existing terminal. Furthermore, the protocol according to the present invention prevents redundancy in displays and enables the navigation device to operate with external computation capacity, thereby saving installation area. Therefore, a navigation service can be provided without relying dominantly on the performance of the navigation device.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A navigation system comprising:
 a first unit comprising a navigation device for determining route guidance at successive points of time using comprehensive route guidance information and sensor information and generating specific route guidance information;
 a second unit comprising a portable terminal separate from the first unit for providing the comprehensive route guidance information to the first unit and displaying the specific route guidance information received from the first unit; and
 a connector for connecting the first unit to the second unit.

2. The navigation system of claim 1, wherein the portable terminal includes a display for displaying the specific route guidance information received from the navigation device.

3. The navigation system of claim 1, wherein the portable terminal transmits information about the present position and a destination to an external information center and receives back from the external information center the comprehensive route guidance information generated by the external information center.

4. The navigation system of claim 1, wherein the navigation device transmits the specific route guidance information to be displayed at each point of time to the portable terminal for display.

5. The navigation system of claim 1, wherein the navigation device transmits a summary of the comprehensive route guidance information to the portable terminal to be displayed.

6. The navigation system of claim 1, wherein the portable terminal requests position information to the navigation device.

7. The navigation system of claim 1, wherein the navigation device also transmits position information determined from sensor information to the portable terminal for display.

8. The navigation system of claim 7, wherein the portable terminal receives position information repeatedly from the navigation device.

9. The navigation system of claim 1, wherein the navigation device also transmits position information determined from sensor information to the portable terminal so that the portable terminal can notify an external party of an emergency state.

10. The navigation system of claim 1, wherein the navigation device transmits voice information to the portable terminal.

11. The navigation system of claim 1, wherein the navigation device transmits information generated from internal sensors to the portable terminal to be displayed.

12. The navigation system of claim 1, wherein the portable terminal transmits sensor error correction information to the navigation device to correct errors in the sensors.

13. The navigation system of claim 1, wherein the sensor information is generated in a GPS sensor and a gyro sensor in the navigation device.

14. The navigation system of claim 1, wherein the navigation device also transmits car status information to the portable terminal to be displayed.

15. The navigation system of claim 1, wherein the portable terminal transmits guidance control information to the navigation device to control a guidance status of the navigation device.

16. The navigation system of claim 1, wherein the portable terminal transmits information for playing voice information to the navigation device.

17. The navigation system of claim 1, wherein the navigation device transmits status information to the portable terminal so that the portable terminal knows a route guidance status of the navigation device.

18. The navigation system of claim 1, wherein the portable terminal serves as an external processor for the navigation device for autonomously generating the comprehensive route guidance information.

19. The navigation system of claim 1, wherein the portable terminal receives the comprehensive route guidance information from an external information center over a wireless network and transmits the comprehensive route guidance information to the navigation device.

20. The navigation system of claim 1, further comprising a monitor set that interfaces with the navigation device, for displaying the specific route guidance information received from the navigation device.

21. The navigation system of claim 1, wherein the navigation device provides hands-free input for functions of the portable terminal.

22. A navigation system comprising:
   a first unit comprising a navigation device for determining route guidance at successive points of time using comprehensive route guidance information and sensor information and generating specific route guidance information;
   a second unit comprising a portable terminal separate from the first unit for providing the comprehensive route guidance information to the first unit;
   a monitor set for displaying the specific route guidance information received from the first unit; and
   a connector for connecting the first unit to the second unit.

23. The navigation system of claim 22, wherein the monitor set is connected to the navigation device via a UART 1 port, for inter-processor communication and exchanging navigation information with the navigation device, and to the portable terminal via a UART 2 port, for communication with the portable terminal.

24. The navigation device of claim 23, wherein the navigation device includes a connection and disconnection sensor for sensing connection to and disconnection from the monitor set and controlling connection to the UART 1 port and the UART 2 port.

* * * * *